United States Patent [19]

Moslehi

[11] Patent Number: 5,103,182
[45] Date of Patent: Apr. 7, 1992

[54] ELECTROMAGNETIC WAVE MEASUREMENT OF CONDUCTIVE LAYERS OF A SEMICONDUCTOR WAFER DURING PROCESSING IN A FABRICATION CHAMBER

[75] Inventor: Mehrdad M. Moslehi, Dallas, Tex.

[73] Assignee: Texas Instruments Incorporated, Dallas, Tex.

[21] Appl. No.: 503,005

[22] Filed: Apr. 2, 1990

[51] Int. Cl.⁵ .......................................... G01N 22/00
[52] U.S. Cl. ................................. 324/642; 324/644; 324/637; 324/719
[58] Field of Search ............... 324/630, 637, 639, 642, 324/644, 646, 647, 719; 29/25.01; 118/712

[56] References Cited

U.S. PATENT DOCUMENTS

| | | | |
|---|---|---|---|
| 4,704,576 | 11/1987 | Tributsch et al. | 324/719 X |
| 4,767,982 | 8/1988 | Florig et al. | 324/640 |
| 4,818,930 | 4/1989 | Flemming et al. | 324/643 X |
| 4,866,370 | 9/1989 | Flemming et al. | 324/639 |
| 4,868,490 | 9/1989 | Blumenthal | 324/715 |

Primary Examiner—Jack B. Harvey
Attorney, Agent, or Firm—James C. Kesterson; B. Peter Barndt; Richard L. Donaldson

[57] ABSTRACT

A non-invasive sensor system (50) for real-time in situ measurements of sheet resistance and thickness of conductive layers of a semiconductor wafer. The sensor (50) includes a microwave source (78) for generating a plurality of microwave signals. An emitter waveguide (52) receives the plurality of microwave signals from the microwave source (78) and emits the microwave signals in the direction of the semiconductor wafer (20) in fabrication chamber (18). The collector waveguide (84) detects the reflected microwave signals from the semiconductor wafer (20). A dual directional coupler (64) communicates with emitter waveguide (52) to direct the microwave signals to and from the emitter waveguide (52) and to generate a plurality of electrical signals that relate to semiconductor wafer (20), conductive layer (108), and deposition vapor physical characteristics. These physical characteristics include conductive layer thickness, resistivity, and substrate temperature. An alternative embodiment provides measurements of plasma vapor density and other interferometric parameters.

32 Claims, 8 Drawing Sheets

— 1.5"/70/75 mm set-up

ELECTROMAGNETIC WAVE MEASUREMENT OF CONDUCTIVE LAYERS OF A SEMICONDUCTOR WAFER DURING PROCESSING IN A FABRICATION CHAMBER

NOTICE:

The U. S. Government has a paid-up license in this invention and the right in limited circumstances to require the patent owner to license others on reasonable terms as provided for by the terms of a contract with the United States Air Force under the program name MMST.

TECHNICAL FIELD OF THE INVENTION

The present invention generally relates to measurement of conductive layers of a semiconductor wafer, and more particularly to a method and apparatus for non-invasive real-time in-situ semiconductor device conductive layer thickness and sheet resistance measurements on semiconductor wafers.

BACKGROUND OF THE INVENTION

Integrated circuit chip manufacturers fabricate semiconductor devices layer by layer on semiconductor wafers. The layers may comprise various dielectric layers or insulating layers in addition to one or more of the following conductive layers: a thin metal coating such as tungsten or aluminum, copper, or gold, a thin polysilicon coating doped with conductive impurities, and other layers of metal silicides and metal nitrides. Normal chip manufacturing includes formation of various patterned layers of different materials in sequence on a semiconductor substrate such as silicon. The semiconductor wafer accepts the conductive metal coating, or polysilicon coating, or metal oxide coating as thin film or films usually less than 1 $\mu$m thick. Process control and manufacturing tolerances apply to these sequential fabrication processes. Usually deviations from specified target tolerances in excess of only a few percentage points may result in defective and rejected semiconductor chips. Semiconductor device manufacturers usually can only discard defective semiconductor chips, thus resulting in undesirable production process waste and increased device manufacturing costs. A need thus exists for accurate techniques to measure physical parameters of various material layers including conductive layers during the fabrication process. These physical properties include the conductive layer thickness, sheet resistance, and substrate temperature during a fabrication process step.

Methods for applying semiconductor wafer conductive layers include processes known as chemical-vapor deposition (CVD), evaporation, and physical-vapor deposition (PVD) or sputtering. These thin film deposition processes usually take place in vacuum tight deposition chambers, such as these called Automated Vacuum Processors (AVPs) filled with process gases containing the chemical species for deposition of metals such as tungsten or aluminum. In single-wafer deposition equipment, the semiconductor wafer normally rests face downward or upward on support pins in the deposition chamber. During the CVD process, a lamp or some other heat source raises the wafer temperature to cause the wafer to interact with the process vapors. That process results in deposition of the desired conductive layer on the semiconductor wafer.

It is important to know conductive layer physical properties in real-time and in situ during PVD and CVD processes as well as during etch processes employed to form the necessary layer patterns. Also, monitoring various process parameters can provide important information regarding the deposition process itself and can be used for real-time process control applications. Both CVD and PVD processes, however, require noninvasive real-time, in situ conductive layer thickness or sheet resistance measurements for effective and reliable process control and process end-point detection. However, known methods of direct conductive layer physical property measurement usually require some sort of physical contact with the conductive layer on the wafer. But, physical contact with the wafer in the processing equipment disrupts the deposition process and may reduce the device manufacturing yield.

Known methods of process control during fabrication of conductive layers usually entails monitoring and control of process parameters such as wafer temperature, deposition or etch process duration, and process gas flows and pressure. These control methods are based on statistical process control techniques and use statistical process data to adjust process parameters during the deposition or etch process. These process control techniques, however, can often provide only indirect indication of actual conductive layer physical properties during and at the end of the deposition or etch process based on some previously measured deposition or etch kinetics data.

Conventional testing methods are used for direct semiconductor conductive layer measurements only outside the processing reactor and after the conductive layer deposition process ends. Thus, at that point the manufacturer removes the semiconductor wafer from the fabrication chamber to directly measure whether the conductive layer meets the necessary physical specifications for its design application. This method for determining semiconductor wafer conductive layer physical characteristics is, therefore, both non-real-time, and ex situ. This measurement method thus has little real-time process control value to the manufacturer and has use only in post-process quality assurance and statistical process control.

Consequently, a need exists for a method and apparatus for making real-time, in situ, non-invasive semiconductor wafer conductive layer physical property measurements. A need also exists for a technique to provide more complete information on plasma physical properties during the plasma deposition or etch process. These plasma physical properties include plasma density.

SUMMARY OF THE INVENTION

The present invention accordingly provides an apparatus and method for real-time in-situ semiconductor wafer conductive layer measurements that substantially eliminate or reduce disadvantages and limitations associated with prior semiconductor wafer conductive layer measurement methods. One aspect of the invention is a sensor for non-invasive real-time in situ semiconductor wafer conductive layer measurements in a chemical-vapor deposition, sputtering, or plasma etch chamber. The sensor includes a low-power high-frequency electromagnetic microwave source that generates and transmits electromagnetic waves via an emitter waveguide. The emitter waveguide emits microwave energy via its open end or a small microwave antennae in the direction of a semiconductor device within the deposition chamber. Microwave detection circuitry and a computer receive and convert the electromagnetic energy that the semiconductor wafer reflects into the physical properties of the conductive layer and semiconductor wafer.

Another aspect of the present invention includes a sensor for non-invasive real-time in-situ semiconductor wafer conductive layer measurements in a deposition or etch chamber. An electromagnetic source generates a plurality of electromagnetic waves scanned in time over a range of frequencies. An emitter waveguide within the wafer processing chamber receives the plurality of electromagnetic waves from the electromagnetic wave source and emits the electromagnetic waves in the direction of the semiconductor wafer. The semiconductor wafer, located a short distance from and out of contact with the emitter waveguide, receives and reflects a portion of the electromagnetic waves. A receiver waveguide detects the reflected electromagnetic waves from the semiconductor wafer. A dual directional coupler communicates with the emitter and receiver waveguides to direct the electromagnetic waves to and from the emitter and receiver waveguides and to provide a capability for measuring the incident and reflected microwave powers in the emitter waveguide and the collected microwaver power in the receiver waveguide. Solid-state detectors perform microwave power measurements. These electrical signals comprise a transmitted power signal (incident minus reflected powers in the emitter waveguide) proportional to the electromagnetic wave power that the emitter waveguide emits and a collected power signal proportional to the electromagnetic wave power that the semiconductor wafer reflects and the receiver waveguide receives. The collected microwave power and, more precisely, the ratio of the collected power to the transmitted power directly relates to certain physical characteristics of the semiconductor wafer and the deposition process environment within the deposition chamber. These physical characteristics include conductive layer thickness, sheet resistance, and substrate temperature as well as substrate doping.

A technical advantage of the invention is that it makes possible real-time process control. Because the method and apparatus are non-invasive, real-time, and in situ, a process control computer can make continuous adjustments during the deposition process. Adjustments may include changing the vapor flow rate or pressure in the deposition chamber, changing the wafer temperature, or terminating the process at the proper end-point moment when the semiconductor wafer satisfies design parameters that the sensor system measures (e.g., endpoint detection). This ability to adjust the process as it proceeds can significantly reduce production of defective semiconductor wafers and enhance the device manufacturing yield.

Yet another technical advantage of the present invention is its capability to provide real-time process control information for future applications such as fast turnaround flexible microfactories.

BRIEF DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

DETAILED DESCRIPTION OF THE INVENTION

The preferred embodiment of the present invention is best understood by referring to FIGS. 1–4 of the drawings, like numerals being used for like and corresponding parts of the various drawings.

Figure 1:
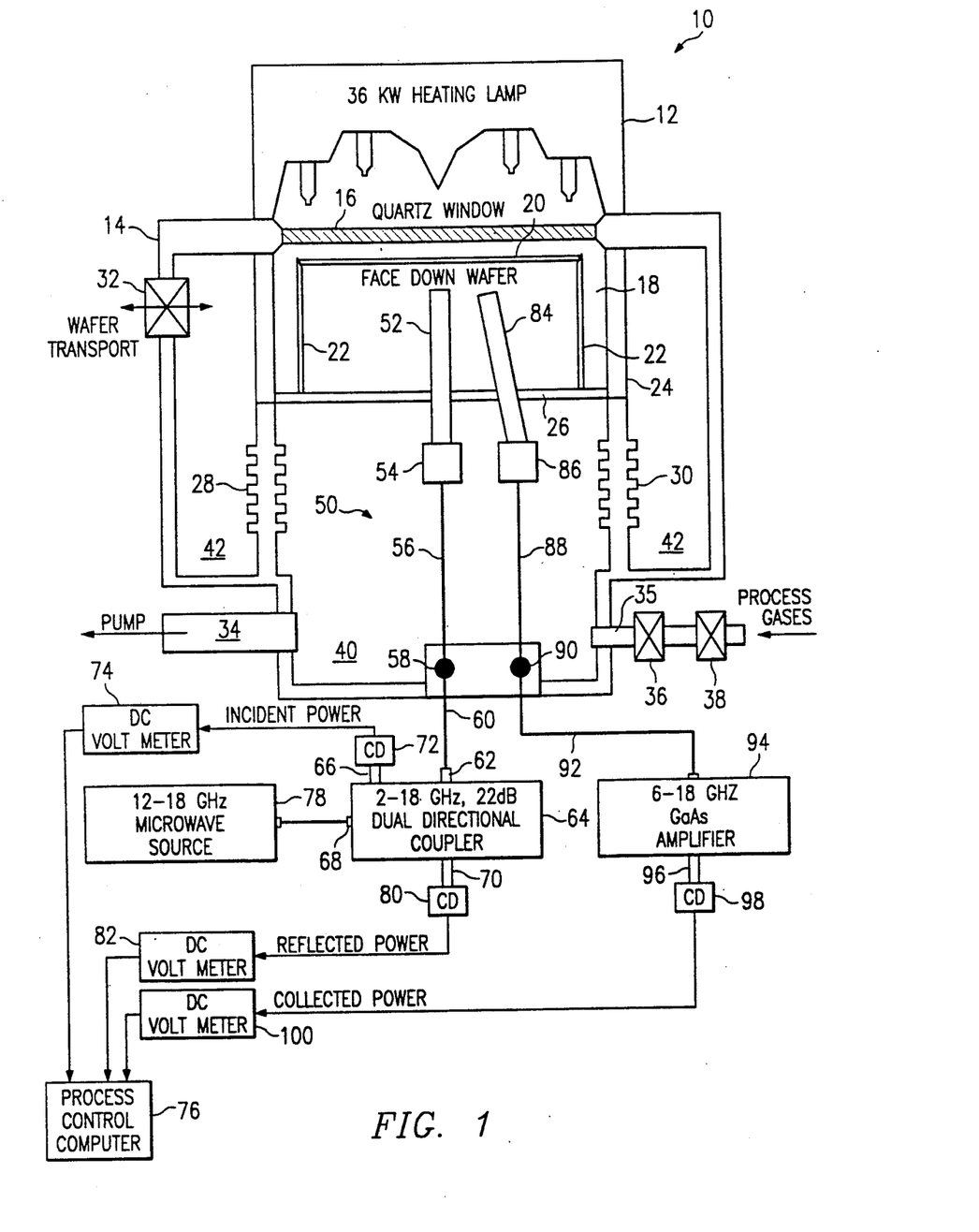
FIG. 1 is a diagrammatic, partially broken-away view of a preferred embodiment of the non-invasive sensor for real-time in-situ semiconductor wafer conductive layer physical property measurements.

FIG. 1 shows a diagrammatic, partially broken-away view of a chemical vapor deposition (CVD) semiconductor processing apparatus 10 that employs a preferred embodiment of the present invention. Semiconductor processing apparatus comprises vacuum-tight casing 14 in which the process chamber collar 24 is located and in which processing occurs and heating lamp 12 for generating process heat energy. Vacuum-tight casing 14 comprises a quartz window 16 for transmitting the wafer heating energy into process chamber 18. Within process chamber 18, a semiconductor wafer 20 sits, usually face down, on three or four low thermal mass pins 22. Process chamber 18 includes process chamber collar 24 and base support or counter electrode 26. Base support 26 connects to process chamber collar 24 and supports low thermal mass pins 22. Bellows 28 supports process chamber 18 and operates to translate process chamber 18 vertically to allow wafer handling and transfer between the vacuum load lack chamber and the process chamber 18 via isolation gate valve 32. Semiconductor processing apparatus 10 further comprises isolation gate valve 32 as part of vacuum-tight casing 14 for interaction between the load lock chamber and the process chamber 18 and for inserting and removing semiconductor wafer 20. Pumping mechanism 34 attaches to vacuum-tight process chamber 18 for pulling vacuum on the processing apparatus 10. Gas inlet line 35 includes toggle valve 36 and needle valve 38 or mass-flow controller that permit semiconductor process gases to enter semiconductor processing apparatus 10. Translation compartment 40 receives semiconductor process gases and provides space for process chamber 18 to vertically translate within semiconductor processing apparatus 10 in response to raising and lowering bellows 28 during wafer handling.

The preferred embodiment of the present invention also appears in FIG. 1 as non-invasive sensor system 50 within semiconductor processing apparatus 10. Emitter waveguide 52 protrudes through base support 26 along the vertical central axis of process chamber 18. Waveguide-to-coaxial adapter 54 connects emitter waveguide 52 to coaxial connector 56. Coaxial connector 56 passes through translation compartment 40 via vacuum coaxial feedthrough 58 at the lower section of vacuum-tight casing 14. Coaxial cable 60 begins at vacuum feedthrough 58 and connects to emitter port 62 of dual-directional coupler 64. Dual-directional coupler 64 includes emitter crystal detector port 66 for incident power measurement, microwave source port 68, and detector crystal detector port 70 for reflected power measurement in transmitting wave guide arm 51. Emitter crystal detector port 66 connects to emitter crystal detector 72 which electrically connects to DC voltmeter 74. DC voltmeter 74 directs a measurement signal representing the indicent microwave power to process control computer 76. Microwave source port 68 receives a 12-18 GHz microwave signal from microwave signal source 78. Reflected power crystal detector port 70 for transmitting waveguide section connects to a crystal detector 80 which sends a DC signal to DC voltmeter 82 representing the reflected microwave power in transmitting waveguide arm 51. DC voltmeter 82 sends a measurement signal to process control computer 76.

In the preferred embodiment, non-invasive sensor system 50 further comprises collector waveguide 84 that protrudes through base support 26 of process chamber 18 for receiving at least a portion of the signals that emitter waveguide 52 emits and that semiconductor wafer 20 reflects. Collector waveguide 84 connects to waveguide-to-coaxial adapter 86. Coaxial connector 88 connects waveguide-coaxial adapter 86 to vacuum feedthrough 90. Coaxial cable 92 connects coaxial-vacuum feedthrough 90 to 6-18 GHz GaAs amplifier 94. GaAs amplifier 94 directs an amplified signal through collector crystal detector port 96 to collector crystal detector 98. Collector crystal detector 98 generates a DC signal proportional to the collected microwave power and directs the signal to DC voltmeter 100. DC voltmeter 100 transmits a measurement signal to process control computer 76 representing the collected microwave power.

In the preferred embodiment, emitter waveguide 52 appears within process chamber 18 at the semiconductor wafer 20 central axis in a line nearly perpendicular with semiconductor wafer 20 and base support 26. Other locations within process chamber 18, however, are possible according to such factors as the particular geometric configuration of process chamber 18. For example, a possible configuration would include placing emitter waveguide 52 on a side of semiconductor wafer 20 opposite that of collector waveguide 84. Factors that determine the optimal configuration include ease of sensor hardware implementation, enhanced signal-to-noise ratio, large dynamic range, good response sensitivity, and negligible short-term and long-term signal drifts.

Collector waveguide 84 penetrates base support 26 a distance of 3.8 cm from the centerline of emitter waveguide 52 at an angle of less than 90° from base support 26 and in the direction of the centerpoint of semiconductor wafer 20.

During a conductive layer deposition process in a typical process chamber, the distance between semiconducter wafer 20 and base support 26 is 10.4 cm. The preferred embodiment of the present invention uses a distance of approximately 30 mm 1.18" between emitter waveguide 52 and semiconductor wafer 20 to optimize microwave incidence and reflectance and the sensitivity for conductive film thickness measurements. Distances much shorter than 30 mm cause the sensor to be invasive to the process; greater distances than 30 mm may reduce the detector's sensitivity and response; however, the optimized positions of waveguides depend on the configuration and design of the semiconductor equipment process chamber.

Distances between emitter waveguide 52 and semiconductor wafer 20 may vary, however, depending on other factors including the differences in the microwave frequency and angle of incidence. Depending upon the desired microwave frequency for the emitter, the present invention could use any possible microwave transmitters. Known microwave transmitters operate in various bands including those in the ranges of 15.0 to 18.0 or GHz 12.4 to 18.0 GHz range. These transmitters are sufficient for the purposes of the present invention.

Possible equipment for use as the dual-directional coupler 64 includes Hewlett-Packard equipment model HP 11692D dual direction coupler together with HP 8472B crystal detectors to generate the above mentioned DC voltages. Although the preferred embodiment includes dual directional coupler 64, the invention may use one or more unidirectional couplers capable of performing the same functions as dual directional coupler 64.

Microwave source 78 determines the frequency that emitter waveguide 52 emits. According to the preferred embodiment of the present invention, the frequency should be large enough so that the microwave wavelength is small compared to the semiconductor wafer diameter and emitter waveguide 52 can send microwave energy toward semiconductor wafer 20 as a directional beam. Also, the microwave wave length should be small relative to semiconductor wafer 20 (which is approximately 150 mm. in diameter) and process chamber 18 (which typically approximates 180–300 mm. diameter). The frequency of 10 GHz has a wave length of approximately 3 cms. which is sufficiently small for this purpose. For the preferred embodiment of the invention, this establishes a lower frequency limit.

With frequencies much greater than 30 GHz, most of the microwave energy interaction will be with the surface layer of the semiconductor wafer. This results in relatively poor signal-to-noise ratios and sensitivities for the upper thickness range of typical conductive layer thickness measurements. This establishes an upper frequency limit in the preferred embodiment. Consequently, for the preferred embodiment, and based on a maximum tungsten thickness of approximately 1 $\mu$m, the microwave frequency should be between 10–30 GHz. This frequency band, however, can change according to the particular physical parameters of the semiconductor wafer or conductive material type (e.g., its resistivity) being measured in semiconductor process apparatus 10. The preferred embodiment of the present invention uses a fixed frequency 12 GHz gallium arsenide microwave oscillator as the microwave source 78. Possible components acceptable as the microwave source 78 include Models FS-1280 or FS-3081 from Loral Frequency Sources of Chelmsford, Mass.

In the preferred embodiment, process control computer 76 converts measured signals corresponding to the incident power, reflected power, and collected power values and conductive film thickness and substrate temperature measurements. Process control computer contains look-up tables that translate the collected microwave reflectance data (or more precisely the ratio of collected microwave power in the receiving waveguide to the transmitted microwave power in the emitter waveguide) to conductive layer characteristics such as sheet resistance or thickness. Process control computer 76 could include a program that use look-up tables by correlating measured microwave reflectance values with known values of semiconductor wafer conductive layer sheet resistance, thickness and substrate temperature values. These tables are also useful to determine values for conductive layer sheet resistance or thickness or to detect process end-point time during plasma etching processes. For example, pattern ratios for a known conductive layer etching may form the basis of a look-up table of electromagnetic wave reflectance values versus the conductive layer thickness remaining after the etch.

Process control computer 76 may also control a deposition process using the real-time in-situ measurements performed during the deposition process. For example, if the difference between the measured or reflected set of powers and the look-up table values exceeds predetermined tolerances, process control computer 76 could appropriately adjust process inputs to yield a semiconductor wafer having the desired conductive layer deposition properties. These changes are based on the real-time control of the deposition process that non-invasive, real-time, in situ sensor system 50 of the present invention makes possible.

Figure 2:
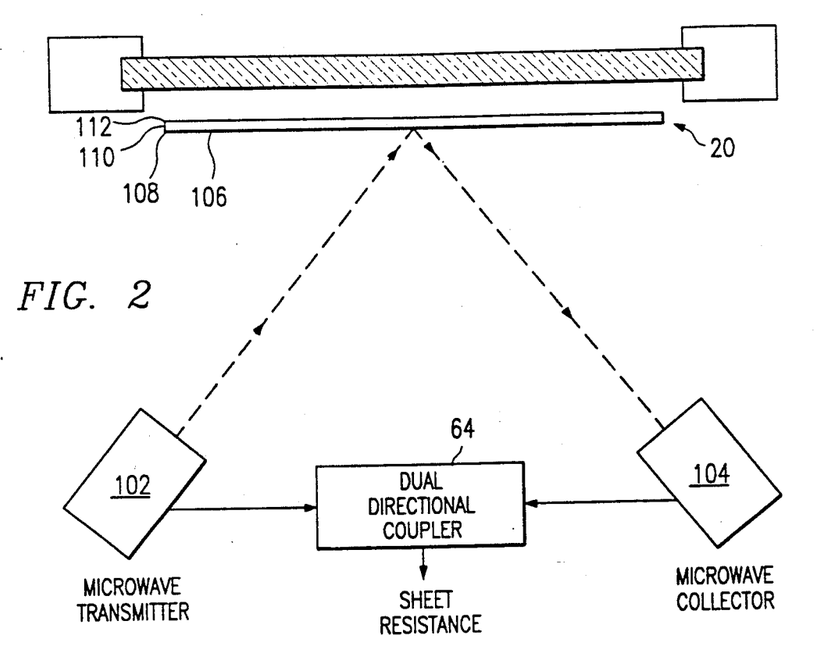
FIG. 2 is a side schematic view of the apparatus showing the emission of incident electromagnetic waves and detection of the reflected electromagnetic waves.

FIG. 2 more particularly shows microwave emission and detection by emitter waveguide 52 within process chamber 18. Emitter waveguide 52 receives microwave power from microwave transmitter 102 and sends microwave energy to the collector waveguide 104 via the reflections from wafer surface. Dual-directional coupler 64 directs a microwave signal to microwave transmitter 102. Microwave transmitter 102 emits microwave energy from within process chamber 18 at a distance from, and in the direction of, semiconductor wafer 20. Semiconductor wafer 20 rests face-down above microwave transmitter 102 and microwave collector 104 and typically comprises conductive layer surface 106, conductive layer 108, conductive layer-silicon substrate interface 110 and silicon substrate 112. Other patterned conductive layers may also be present between the last conductive layer and the semiconductor substrate. Microwave collector 104 appears below semiconductor wafer 20 and provides signals to dual-directional coupler 64 that are proportional to microwave power level that microwave collector 104 detects.

An alternative embodiment of the microwave source 78 employs frequency scanning capabilities for producing frequencies of between 10 and 30 GHz. By scanning the frequency, sensor system 50 produces more information regarding the semiconductor wafer 20 conductive layer and the deposition environment. Frequency scanning, for example, permits conductive film depth profiling and plasma gas density measurements and other interferometric measurements in a plasma deposition or etch process chamber. By scanning the frequency the incident microwave signals can penetrate a range of conductive layer skin-depths. This type of penetration could be useful, for example, in determining physical properties, such as substrate temperatures or polysilicon dopant levels versus depth. Additionally, if measurements are for analysis of conductive layers comprising metals other than tungsten or aluminum or of a wide range of polysilicon dopants, optimal frequencies may differ. Ability to scan electromagnetic signal frequencies increases the flexibility of sensor system 50. Other embodiments of the microwave source 78 apply wave chopping or frequency modulation to improve the signal-to-noise ratio performance of emitter waveguide 52 and collector waveguide 84, thereby increasing conductive layer measurement accuracies and reproducibilities.

Referring now to the operation of non-invasive sensor system 50, microwave source 78 generates a microwave signal and sends the signal to microwave source port 68. Dual directional coupler 64 receives the microwave signal, senses the signal, and directs it through emitter port 62 to coaxial cable 60. The microwave signal traverses coaxial cable 60, coaxial-vacuum feedthrough 58, and coaxial connector 56 to reach waveguide-coaxial adapter 54. Waveguide-coaxial adapter 54 directs the microwave signal to emitter waveguide 52.

Emitter waveguide 52 sends the microwave signal to microwave transmitter 102 (which can be the open end of the waveguide or a small microwave antennae) which emits microwave energy toward semiconductor wafer 20. Microwave energy impinges on and interacts with semiconductor wafer 20. Conductive layer 108 and silicon substrate 112 have certain conductivities. As a result, semiconductor wafer 20 absorbs some of the microwaves, allows transmission of some of the microwaves, and reflects a portion of them. Additionally, phase shift occurs at both the conductive layer surface 106 and conductive layer-substrate interface 110 and during the passage through conductive layer 108 and silicon substrate 112. The sheet resistance of conductive layer 108 and the conductivity of silicon substrate 112 as well as the substrate temperature determine how much electromagnetic energy semiconductor wafer 20 reflects. The silicon substrate doping level and semiconductor wafer 20 temperature determine the conductivity of silicon substrate 112.

Microwave collector 104 (which can be an open-ended waveguide) detects microwave energy that semiconductor wafer 20 reflects. Waveguide-coaxial adapter 54 transmits the reflected signals from microwave collector 104 into coaxial connector 56, coaxial-vacuum feedthrough 58, and coaxial cable 60 return to dual directional coupler 64. Dual directional coupler 64 receives the detected signal at emitter port 62 and sends the signal to reflector crystal detector port 70. Reflector crystal detector 80 converts this signal to a DC signal that DC voltmeter 82 can measure and convert to an input for process control computer 76. Detected DC voltages in part determine conductive layer characteristics including thickness, electrical sheet resistance and temperature. Microwave reflectance is obtained by dividing the collected power in the receiving waveguide arm to transmitted power in the emitter arm (transmitted power=incident power minus reflected power).

At the same time that dual directional coupler 64 sends microwave signals from microwave source 78 to emitter waveguide 52, dual directional coupler 64 also taps and measures the incident power of microwave signals from microwave source 78. Dual directional coupler 64 directs this measurement signal through emitter crystal detector port 66 to emitter crystal detector 72. Emitter crystal detector 72 produces a DC voltage in response to this measurement. This value comprises an input to process control computer 76 representing the incident microwave signal strength inside emitter waveguide 52.

Numerous measurements are possible for determining the effects of conductive layer physical properties on microwave reflectance. With the preferred embodiment of a 12 GHz signal, for example, process control computer 76 can store look-up tables that relate known conductive layer thicknesses or electrical sheet resistance values to microwave reflectance values for given process temperatures and substrate doping. Look-up tables such as these are useful for extracting conductive layer thickness, sheet resistance, and substrate temperature values based on the measured microwave reflectance data. The following are examples implementing non-invasive sensor system 50 to obtain desired conductive layer measurements.

In the preferred embodiment, conductive layer thickness measurements require first measuring microwave reflectance in process chamber 18 at a frequency of 12 GHz and a temperature of 25° C. These measurements are made both with and without a semiconductor wafer in process chamber 18. Next, 12 GHz measurements of semiconductor reflectance are taken in process chamber 18 at normal process temperatures. The method further entails room temperature and process temperature measurements to compare look-up table values to determine substrate background doping levels. With the background semiconductor substrate doping level and starting conditions known and with reference to appropriate look-up tables for the given type of conductive layer, sensor output directly relates to conductive layer thickness and sheet resistance values. This type of measurement is possible at any time during a deposition process or during an etch process.

Semiconductor wafer 20 and conductive layer 108 temperature measurements, given a known substrate doping and conductive layer thickness, essentially follow the above procedure. The difference, however, is that these measurements may use look-up tables for converting reflectance values to temperatures for given substrate doping levels and conductive layer thicknesses.

The non-invasive sensor system 50 of the present invention also has use for making end-point determinations in vapor deposition and etching processes for conductive layers. In conductive layer etching processes, the manufacturer produces patterns of conductive material such as tungsten or aluminum or doped polysilicon on a semiconductor substrate by first depositing a conductive layer and then removing certain portions of the layer according to a design pattern, thereby producing a conductive circuit from the remaining portions of the conductive layer. By generating look-up tables that relate microwave reflectance values to known metal pattern ratios, non-invasive sensor system 50 provides the ability to indicate end-points for conductive etching layer processes. Using non-invasive sensor system 50 this way, however, requires that the conductive layer etching be relatively uniform over the semiconductor wafer surface, because the value that non-invasive sensor system 50 produces is a reflectance value averaged over a fairly surface area of the wafer.

Figure 3:
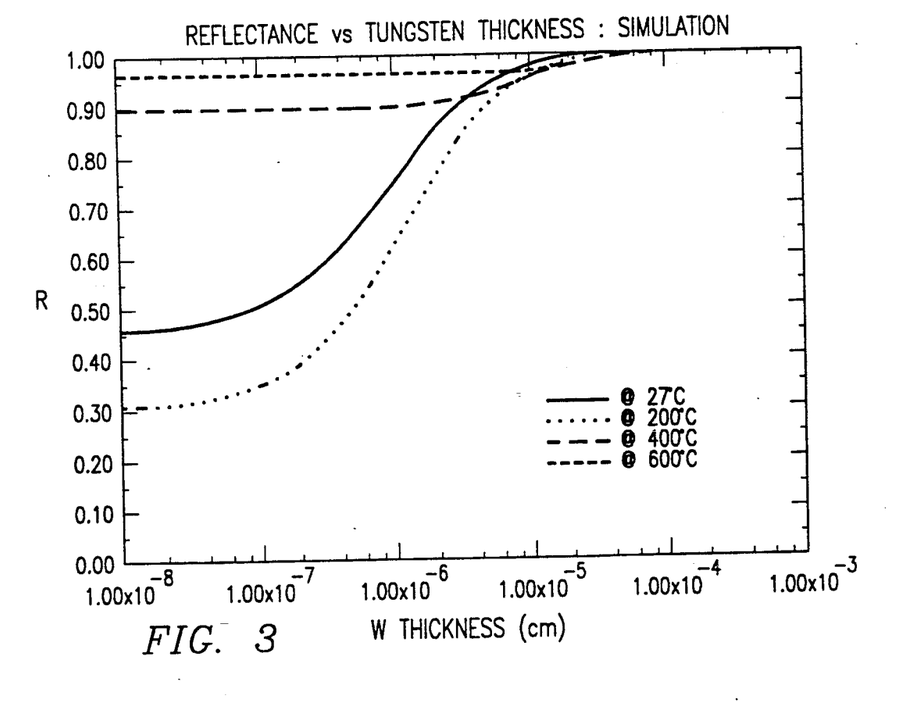
FIG. 3 is a calculated plot of the reflectance of a semiconductor wafer as a function of semiconductor wafer conductive layer thickness.

Having explained the components and their operation, results from several illustrative embodiments follow. FIG. 3 comprises a plot of semiconductor wafer reflectance values versus conductive layer thickness at a frequency of 10 GHz with the microwave signal directed to the face of semiconductor wafer 20. The plot expresses the results of a computer simulation based on analytical expressions for the existing physical relationships. In the simulation, semiconductor wafer 20 has a doping of $10^{15}/cm^3$ that produces a known conductivity of 0.2 Ohm-cm at 27° C. The plot contains four curves for four different temperatures, starting at room temperature of 27° C. and extending up to 600° C., which is a typical upper temperature for CVD tungsten processes.

The curve for 27° C. begins with a reflectance of about 31% with 1 angstrom of tungsten, or in other words, the effective absence of a tungsten film. This starting point microwave reflectance increases as temperature increases to 200° C. and then further increases for temperatures of 400° and 600° C. Since the tungsten film is effectively absent at this stage, variation in silicon conductivity causes this modulation entirely. This occurs according to the following principles. As temperature increases, electrical carrier mobility in the silicon substrate decreases, because lattice scattering dominates and lattice vibration increases. However, the intrinsic silicon substrate carrier concentration also increases with temperature and this leads to a competition between carrier density enhancement and mobility reduction effects. For small increases in temperature, carrier mobility reduction dominates to result in a net decrease in substrate conductivity. At high temperatures, carrier concentration, which is an exponential function of temperature, takes over and rapidly increases the conductivity. This causes the rise that FIG. 3 shows in the reflectance of the nearly bare silicon wafer at temperatures greater than 400° C.

Tracing the 27° C. curve further, reflectance rises very gradually until about 10 angstroms, after which reflectance starts to rise rapidly. At extremely small thicknesses, such as 10 angstroms, which is barely two or three atomic layers, the validity of all the computer simulations of FIG. 3 is questionable. However, physical intuition suggests that the tungsten layer at its very inception will have little impact on the microwaves, and the silicon substrate will continue to have a large effect on the reflectance characteristics. For high conductivities of silicon (i.e., The 400° and 600° C. curves), this effect lasts until even greater thicknesses of tungsten films. At such temperatures, reflectance modulation by the tungsten film starts at only a few hundred angstroms. The growing tungsten film approaches a bulk conductor in its characteristic and consequently reflects most of the incident microwaves. After the film reaches an approximate thickness of one micron, very little microwave power penetrates the semiconductor wafer and film and at approximately a ten microns thickness, reflectance approaches unity. All the different temperature curves come together at this point, such that the tungsten, acting almost as a good conductor, dominates all microwave reflectance effects.

Figure 4:
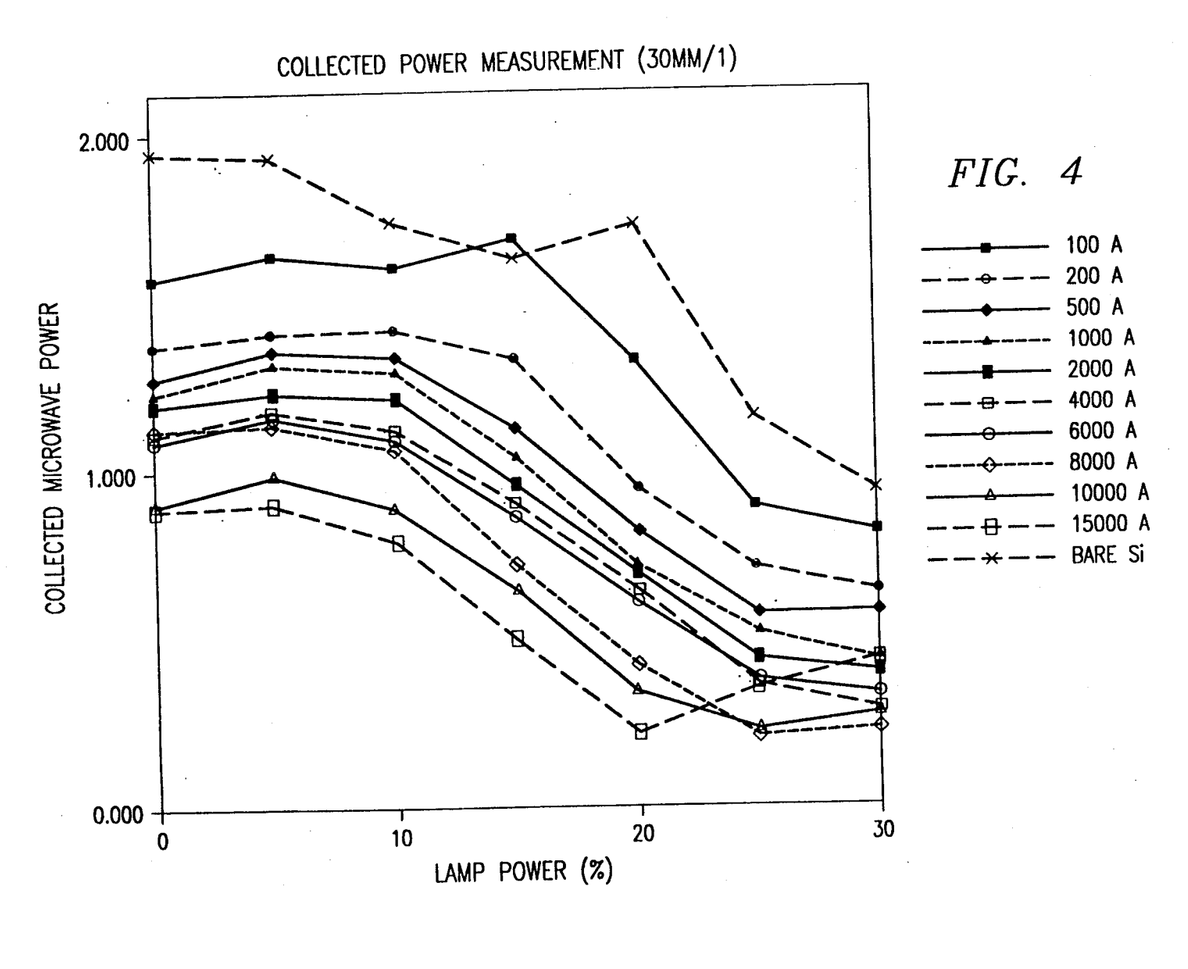
FIG. 4 is a plot of the measured collected microwave power as a function of heating lamp power showing the response of the apparatus to changes in substrate temperature up to about 600° C. and CVD tungsten film thickness (in the range of 100 to 15,000 angstroms).

FIG. 4 shows the effects of changing substrate temperature and tungsten film thickness on microwave reflectance. FIG. 4 plots collected microwave power measurements versus lamp power as percent of the 36 KW lamp full power of the preferred embodiment. These measurements were recorded from an experimental configuration of the preferred embodiment. The collected microwave power measurements directly relate to microwave reflectance from semiconductor wafer 20. In the plot of FIG. 4, lamp power ranges from 0 to 30% of the 36 KW lamp power. A value of 30% of lamp power yields a semiconductor wafer temperature of approximately 600° C. Measurements are shown for semiconductor wafers having CVD tungsten conductive layer thicknesses of nearly 100, 200, 500, 1000, 2000, 4000, 6000, 8000, 10,000, and 15,000 angstroms and for a bare silicon wafer. Emitter waveguide 52 emits at a distance of 30 mm. from semiconductor wafer 20. As the FIG. 4 shows, however, the conductive layers respond strongly to the temperature of the wafer. Based on these experimental results, the non-invasive sensor system 50 of the present invention has application for temperature monitoring of the semiconductor wafer during deposition processes.

Figure 5:
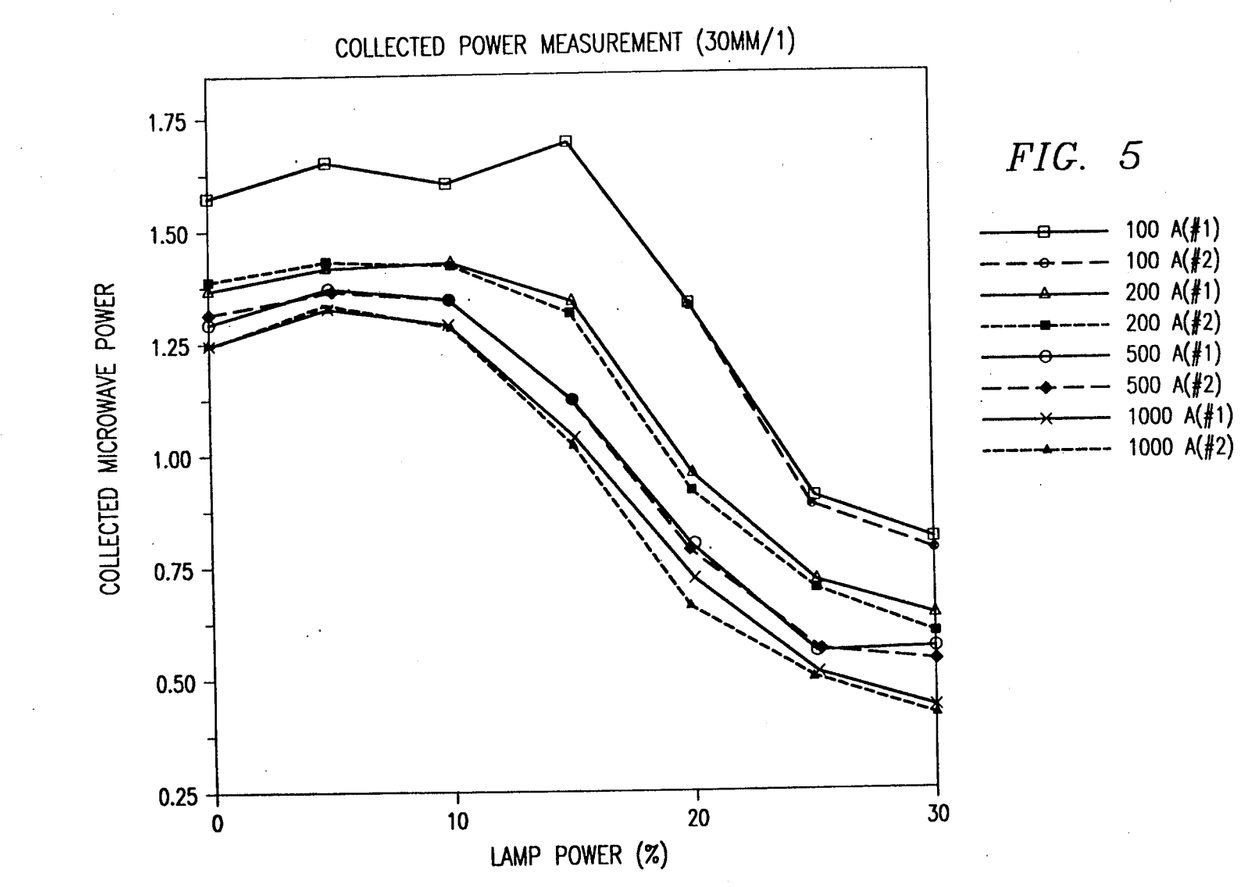
FIGS. 5 and 6 show sensor reading repeatability and the effect of silicon substrate temperature drift due to open-loop lamp heating on sensor readings.
Figure 6:
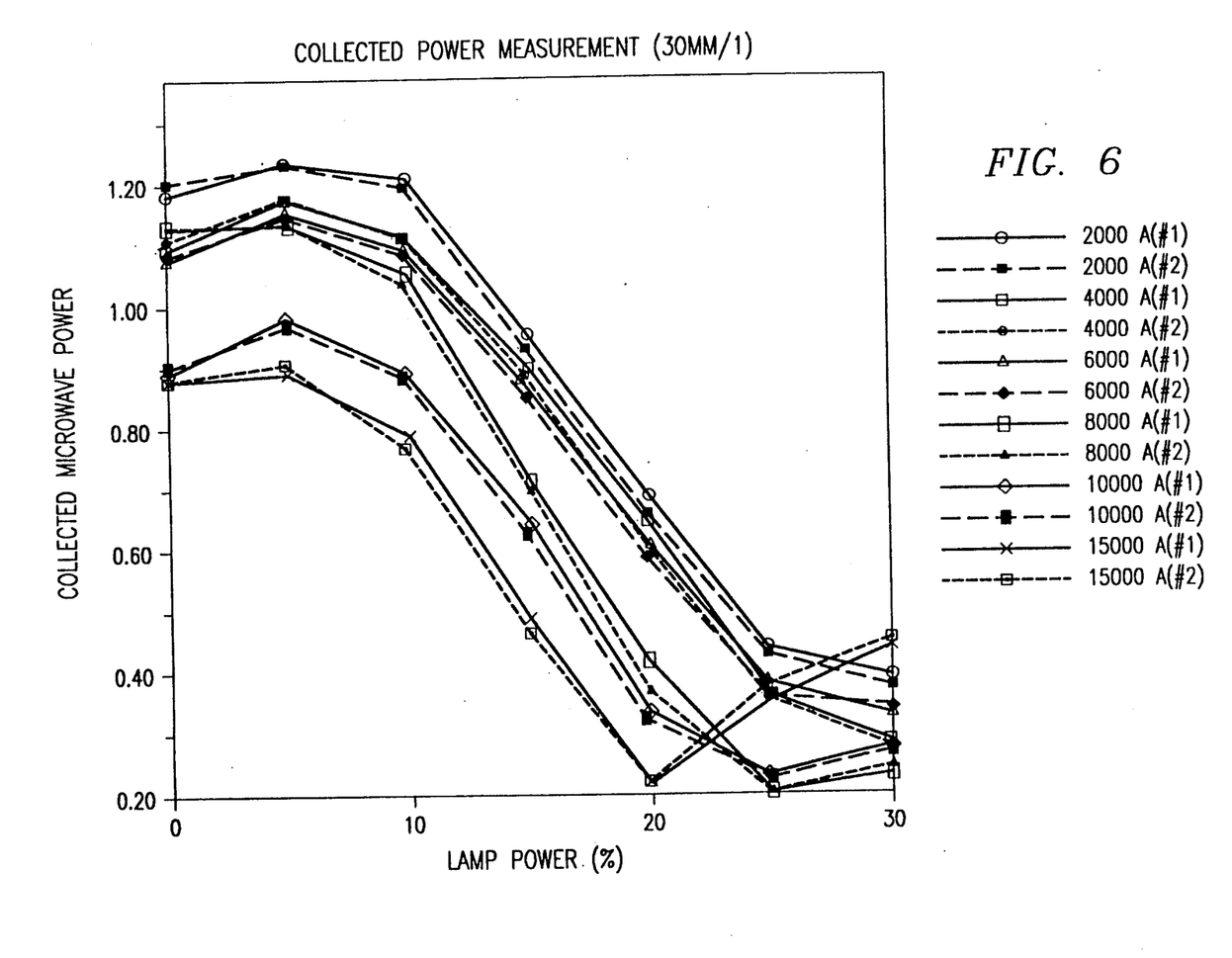

FIGS. 5 and 6 show the effect of silicon substrate temperature drift during constrant lamp power substrate heating cycles sensor readings. These figures use the same 36 KW lamp scale, tungsten conductive layer thickness, and waveguide configuration that generate FIG. 4. FIGS. 5 and 6 show the collected microwave power for constant lamp powers at an earlier first measurement time, #1, and at a second later measurement time, #2, during a wafer processing step. FIGS. 5 and 6 show the same thicknesses as shown in FIG. 4, but do so on two plots to minimize congestion in displaying information. As FIGS. 5 and 6 indicate, there is little difference between the two sets of measurements similar measurements over wafer heating time. Other measurements verify that the observed variations are in large part due to slight drifts of silicon substrate temperatures. These measurements, in summary, show that the sensor of the present invention provides an accurate and reproducible measure of microwave reflectance from which to determine conductive layer physical properties.

Figure 7:
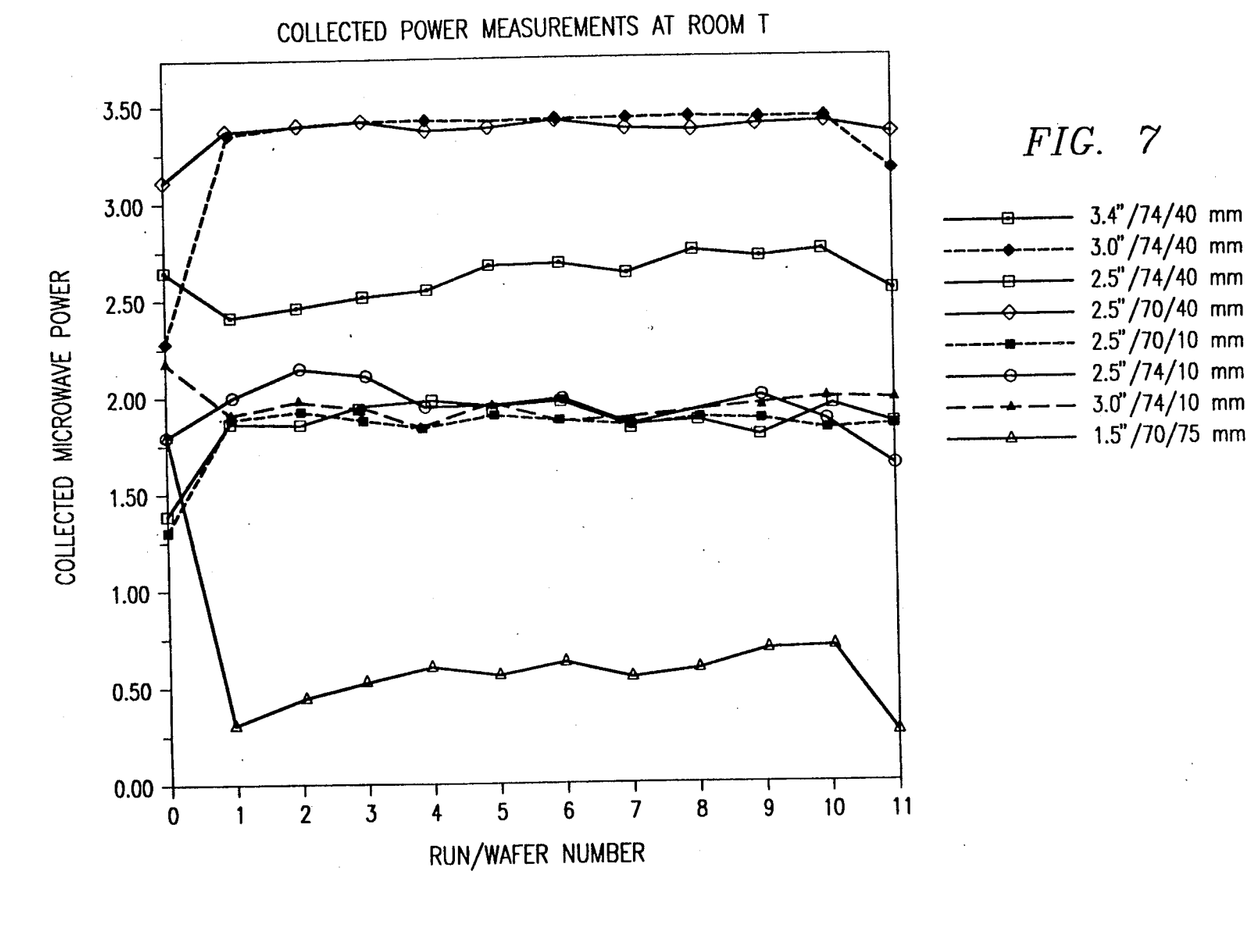
FIGS. 7, 8 and 9 show the dependance of the collected and reflected power measurements on the relative positions of emitter waveguide and collector waveguide when the substrate is at room temperature.
Figure 8:
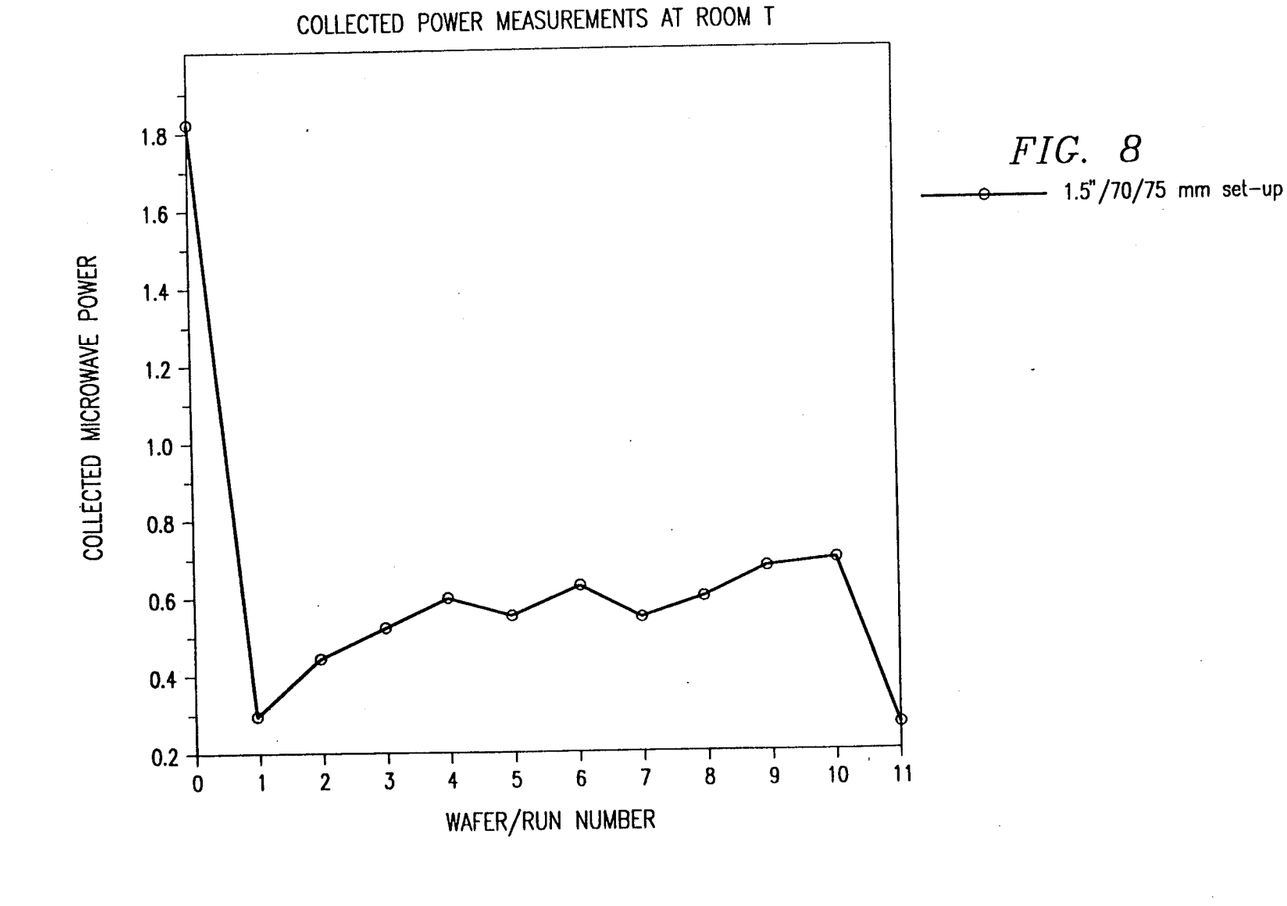
Figure 9:
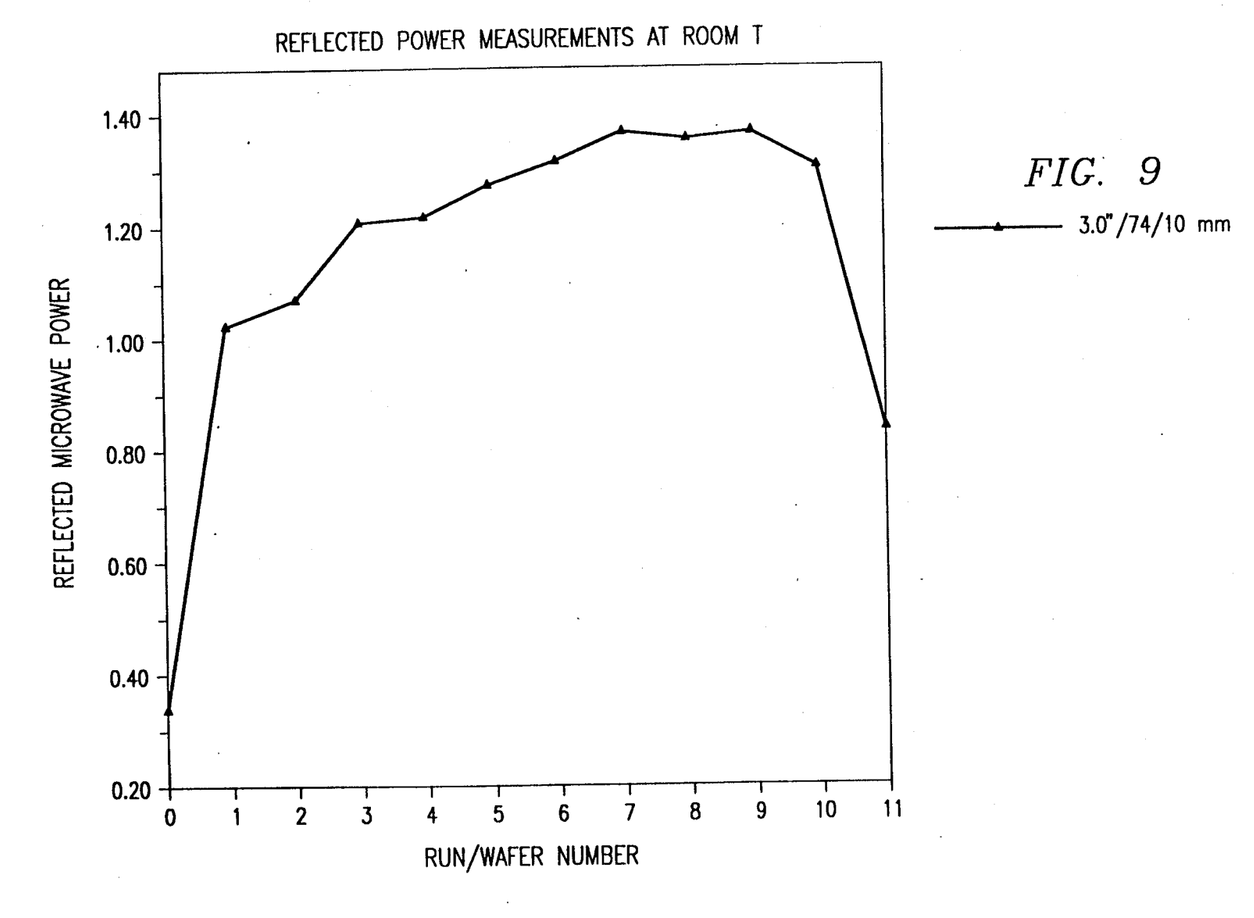

FIGS. 7, 8, and 9 show the dependence of the collected and reflected power measurements on the relative positions of emitter waveguide 52 and collector waveguide 84 at room temperature. FIG. 7 shows collected microwave power measurements as functions of emitter waveguide 52 and collector waveguide 84 positions. The FIG. 7 legend shows a set of numbers separated by slashes, for example, 3.4"/74/40 mm. These numbers mean that, in the deposition chamber, emitter waveguide 52 closest point to semiconductor wafer 20 is 3.4 inches (or 86 mm), that the angle from the horizontal that collector waveguide 84 makes in the direction of the center of semiconductor wafer 20 is 74 degrees, and that the distance from base support 26 to the end point of collector waveguide 84 closest to semiconductor wafer is 40 millimeters. The "Run/Wafer Number" abscissa of FIGS. 7–9 relate to the particular semiconductor wafer thicknesses already mentioned in connection with FIGS. 5 and 6. In particular, Run 0 shows the measurements taken with an empty chamber. Run 1 shows results with a wafer having a 100 angstrom tungsten layer, Run 2 with a 200 angstrom layer, Run 3 with a 500 angstrom layer, etc., in the order specified for FIGS. 5 and 6.

As FIG. 7 shows, sensitivity to microwave reflectance from semiconductor wafer 20 depends strongly on the positions of the emitter waveguide 52 and collector waveguide 84 in process chamber 18. FIG. 8 isolates the collected power measurement curve showing a reasonable sensitivity of microwave reflectance from semiconductor wafer 20 to tungsten film thickness, i.e., the curve for the 1.5" (approx. 38 mm)/70/75 mm configuration. FIG. 9 isolates reflected power measurements in the emitter waveguide arm for the configuration having an acceptable sensitivity for reflected microwave power measurements, i.e., 3.0" (approx. 76 mm/74/10 mm. The conductive layer sheet resistance or thickness also modulates the microwave reflectance in the emitter waveguide arm; this parameter can be used in conjunction with the microwave reflectance measurements in the receiving waveguide in order to extract the precise thickness or sheet resistance values for conductive layers. These plots show that depending on whether the desired power level measurement is for emitter reflected power or receiver collected power, different waveguide configurations within the deposition chamber are optimal.

Although the invention has been described with reference to the above specific embodiments, this description is not meant to be construed in a limiting sense. Various modifications of the disclosed embodiment, as well as alternative embodiments of the invention will become apparent to persons skilled in the art upon reference to the above description. It is therefore contemplated that the appended claims will cover such modifications that fall within the true scope of the invention.

What is claimed is:

1. An apparatus for non-invasive, real-time, in situ measurement of conductive layers of a semiconductor wafer during processing in a fabrication chamber, comprising:

an electromagnetic signal source for generating electromagnetic waves;

an emitter waveguide in communication with said electromagnetic wave source and fabrication chamber for emitting said electromagnetic waves through the chamber and toward the semiconductor wafer, said emitter waveguide spaced from said conductive layer such that said emitter waveguide is not invasive to said process, and also for detecting a portion of electromagnetic waves reflected from the semiconductor wafer;

at least one coupler in communication with said emitter waveguide for generating a plurality of electrical signals, said plurality of electrical signals comprising an emitted set of electrical signals proportional to the power of said emitter electromagnetic waves and a reflected set of electrical signals proportional to the power of said portion of said electromagnetic waves that the semiconductor wafer reflects, said plurality of electrical signals from said at least one coupler being directly related to measurements of the semiconductor wafer conductive layer; and circuitry for converting said plurality of electrical signals into conductive layer measurements.

2. The apparatus of claim 1 wherein the fabrication chamber for said non-invasive, real-time, in situ measurement of conductive layers of a semiconductor wafer comprises a vapor deposition chamber.

3. The apparatus of claim 1 wherein the fabrication chamber for said non-invasive, real-time, in situ measurement of conductive layers of a semiconductor wafer comprises a conductive layer etch chamber.

4. The apparatus of claim 1 wherein said at least one coupler comprises a dual directional coupler for communicating among said electromagnetic wave source, said emitter waveguide, and said converting circuitry.

5. The apparatus of claim 1 wherein said electromagnetic waves have a frequency range bounded by a lower frequency and an upper frequency, said lower frequency producing a signal wavelength that is small relative to the dimensions of the semiconductor wafer and said upper frequency providing for optimal measurement sensitivity to electromagnetic wave interaction to be with the conductive layer.

6. The apparatus of claim 1 wherein said emitter waveguide further comprises a microwave transmitter for transmitting said electromagnetic waves and a microwave detector for detecting said electromagnetic waves.

7. The apparatus of claim 1, further comprising, a collector waveguide for collecting a portion of said electromagnetic waves.

8. The apparatus of claim 1, wherein said electromagnetic wave source comprises a low frequency solid state frequency source capable of frequency scanning.

9. The apparatus of claim 8, further comprising a microwave signal chopper within said electromagnetic wave source for electronically chopping said electromagnetic waves to improve signal-to-noise ratios.

10. The apparatus of claim 1, further comprising a plurality of detectors for measuring a predetermined aspect of said portion of electromagnetic waves.

11. The apparatus of claim 10, further comprising a process control computer for calculating conductive layer electromagnetic wave reflectance measurements as a function of said emitted and reflected electromagnetic waves.

12. The apparatus of claim 11, further comprising a plurality of electronically recorded look-up tables within said computer for automatically converting semiconductor wafer electromagnetic wave reflectance measurements into conductive film physical property measurements.

13. The apparatus of claim 11, further comprising a plurality of look-up tables that relate to conductive layer etchings for converting said electromagnetic wave reflectance measurements into conductive layer thickness and sheet measurements during etch processes.

14. The apparatus of claim 11, further comprising a plurality of look-up tables that relate to silicon dopant levels for converting said electromagnetic wave reflectance measurements into silicon substrate dopant levels.

15. The apparatus of claim 11, further comprising a plurality of look-up tables that relate to semiconductor wafer temperatures for converting said electromagnetic wave reflectance measurements into semiconductor wafer temperature measurements.

16. The apparatus of claim 11, wherein the deposition chamber contains plasma vapors and further comprising a plurality of look-up tables that relate to plasma density for converting said electromagnetic wave reflectance measurements into plasma vapor electromagnetic wave interaction measurements.

17. The apparatus of claim 1 wherein said emitter waveguide is spaced from said conductive layer between about 1.18 inches and about 3.4 inches.

18. An apparatus for non-invasive, real-time in situ measurements of conductive layers of a semiconductor wafer during processing in a fabrication chamber, comprising:
an electromagnetic wave source for generating electromagnetic waves and comprising a low-power solid state microwave signal source capable of frequency scanning and a microwave signal chopper for electronically chopping said electromagnetic waves;
an emitter waveguide in communication with said electromagnetic wave source and within the fabrication chamber, said emitter waveguide comprising a microwave transmitter spaced from said conductive layer such that said emitter waveguide is not invasive to said process and for transmitting said electromagnetic waves through the chamber and toward the semiconductor wafer and a plurality of microwave detectors for detecting a predetermined aspect of said electromagnetic waves reflected from the semiconductor wafer, said electromagnetic waves having a frequency range bounded by a lower frequency and an upper frequency, said lower frequency producing a signal wavelength that is small relative to the dimensions of the semiconductor wafer and said upper frequency providing for optimal measurement sensitivity to electromagnetic wave interaction with the conductive layer on a semiconductor substrate;
a dual directional coupler for communicating among said electromagnetic wave source and said emitter waveguide, said dual directional coupler comprising measuring circuitry for generating a plurality of electrical signals, said plurality of electrical signals comprising an emitted set of electrical signals proportional to the power of said electromagnetic waves and a reflected set of electrical signals proportional to the power of said portion of said reflected electromagnetic waves, said plurality of electrical signals from said at least one coupler being directly related to measurements of the semiconductor wafer conductive layer;
a process control computer for calculating conductive layer electromagnetic wave reflectance measurements as a function of said emitted and reflected electromagnetic waves; and
a plurality of electronically recorded look-up tables sets within said calculator.

19. The apparatus of claim 18, wherein said plurality of electronically recorded look-up tables comprises a set of look-up tables for converting semiconductor wafer electromagnetic wave reflectance measurements into conductive film physical property measurements.

20. The apparatus of claim 18, wherein said plurality of electronically recorded look-up tables comprises a set of look-up tables for converting said reflectance measurements into conductive layer etching measurements.

21. The apparatus of claim 18, wherein said plurality of electronically recorded look-up tables comprises a set of look-up tables for converting said reflectance measurements into silicon substrate dopant level measurements.

22. The apparatus of claim 18, wherein said plurality of electronically recorded look-up tables comprises a set of look-up tables for converting said reflectance measurements into semiconductor wafer temperature measurements.

23. The apparatus of claim 18, wherein said plurality of electronically recorded look-up tables comprises a set of look-up tables for converting said reflectance measurements into plasma vapor electromagnetic wave interaction measurements.

24. The apparatus of claim 18 wherein said emitter waveguide is spaced from said conductive layer between about 1.18 inches and about 3.4 inches.

25. A method for performing non-invasive real-time in situ semiconductor wafer conductive layer measurements during processing in a fabrication chamber, comprising the steps of:

spacing an emitter waveguide within said fabrication chamber and from said conductive layer such that said emitter waveguide is not invasive to said process;

generating electromagnetic waves;

emitting said electromagnetic waves from said emitter waveguide toward the semiconductor wafer;

detecting a portion of said electromagnetic waves that the semiconductor wafer reflects within the fabrication chamber;

generating a plurality of electrical signals, said plurality of electrical signals comprising an emitted set of electrical signals proportional to said electromagnetic waves and a reflected set of electrical signals proportional to said portion of said electromagnetic waves that the semiconductor wafer reflects, said plurality of electrical signals being directly related to the semiconductor wafer conductive layer measurements; and converting said plurality of electrical signals into semiconductor wafer conductive layer measurements.

26. The method of claim 25, further comprising the step of electronically chopping said electromagnetic waves.

27. The method of claim 25 wherein said step of generating a plurality of electrical signals further comprises the step of producing DC voltages proportional to said emitted set of signals and said reflected set of signals.

28. The method of claim 25, wherein the semiconductor wafer contains a patterned conductive layer formed by etching from said conductive layer and said converting step further comprises the step of converting said plurality of electrical signals into etching end-point detection measurements.

29. The method of claim 25, wherein said detecting step further comprises the step of detecting said portion of reflected electromagnetic waves at different deposition process temperatures.

30. The method of claim 25, further comprising the step of converting said plurality of signals to semiconductor substrate dopant levels.

31. The method of claim 25, wherein said converting step further comprises the step of converting said plurality of signals into semiconductor wafer temperature measurements.

32. The method of claim 25 wherein said spacing step said emitter waveguide is spaced between about 1.18 inches and about 3.4 inches.

* * * * *